United States Patent
Kondo

(10) Patent No.: US 6,721,253 B2
(45) Date of Patent: Apr. 13, 2004

(54) DISKLIKE RECORDING MEDIA, A METHOD FOR DETECTING FORGED DISKS, AN ANTI-FORGERY SYSTEM FOR PERFORMING A TRUE-FALSE JUDGEMENT BASED ON INFORMATION COLLECTED FROM THE RECORDING MEDIA, AND A MANUFACTURING APPARATUS FOR RECORDING INFORMATION IN THE DISKS

(75) Inventor: Tetsuya Kondo, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 69 days.

(21) Appl. No.: 10/326,228

(22) Filed: Dec. 20, 2002

(65) Prior Publication Data

US 2003/0142602 A1 Jul. 31, 2003

Related U.S. Application Data

(63) Continuation of application No. 10/038,534, filed on Jan. 3, 2002, which is a continuation of application No. 09/264,540, filed on Mar. 8, 1999, now Pat. No. 6,363,043.

(30) Foreign Application Priority Data

Mar. 10, 1998 (JP) .............................................. 10-76696

(51) Int. Cl.[7] .............................................. G11B 7/00
(52) U.S. Cl. .............................. 369/53.21; 369/47.12; 369/59.25; 369/275.1
(58) Field of Search .............................. 369/47.1, 47.12, 369/47.14, 47.21, 47.55, 53.1, 53.11, 53.13, 53.21, 53.31, 53.45, 59.1, 59.23, 59.25, 84, 275.1

(56) References Cited

U.S. PATENT DOCUMENTS

| | | | |
|---|---|---|---|
| 5,805,551 A | * | 9/1998 | Oshima et al. .......... 369/53.21 |
| 5,812,501 A | | 9/1998 | Moribe et al. |
| 5,875,156 A | * | 2/1999 | Ito et al. .................. 369/275.1 |
| 5,991,499 A | | 11/1999 | Yagasaki et al. |
| 6,078,552 A | | 6/2000 | Yamamoto et al. |
| 6,285,762 B1 | | 9/2001 | Gotoh et al. |
| 6,381,367 B1 | | 4/2002 | Ryan |

FOREIGN PATENT DOCUMENTS

| | | |
|---|---|---|
| JP | 05266575 | 10/1993 |
| JP | 07021687 | 1/1995 |
| JP | 07021688 | 1/1995 |

* cited by examiner

*Primary Examiner*—Muhammad Edun
(74) *Attorney, Agent, or Firm*—Anderson Kill & Olick, P.C.; Eugene Lieberstein; Michael N. Meller

(57) ABSTRACT

A recording medium includes first information selected from a plurality of information patterns and second information selected from another plurality of information patterns for the true-false judgement. A true-false judging device performs a statistic analysis when any coincidence is found between the readout combination of the first and second information and registered combination patterns, to identify an inspected recording medium as a forged product based on the result of the statistic analysis.

15 Claims, 12 Drawing Sheets

FIG. 1
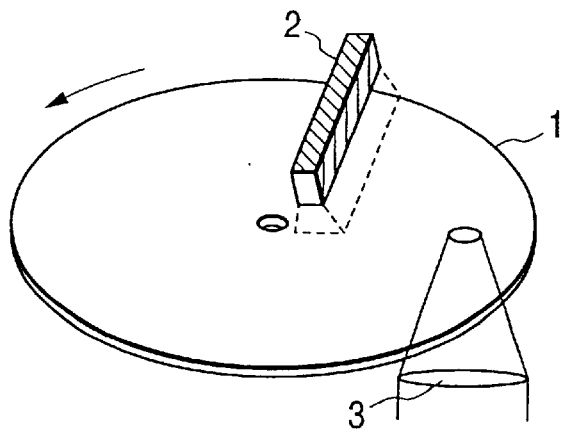
FIG. 2
MAIN INFORMATION "A"
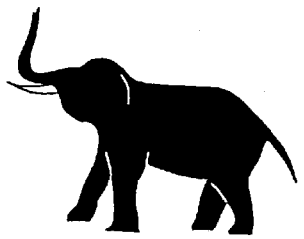
5 PATTERNS
× PRINT INFORMATION "B"
5 PATTERNS
= 25 PATTERNS
FIG. 3
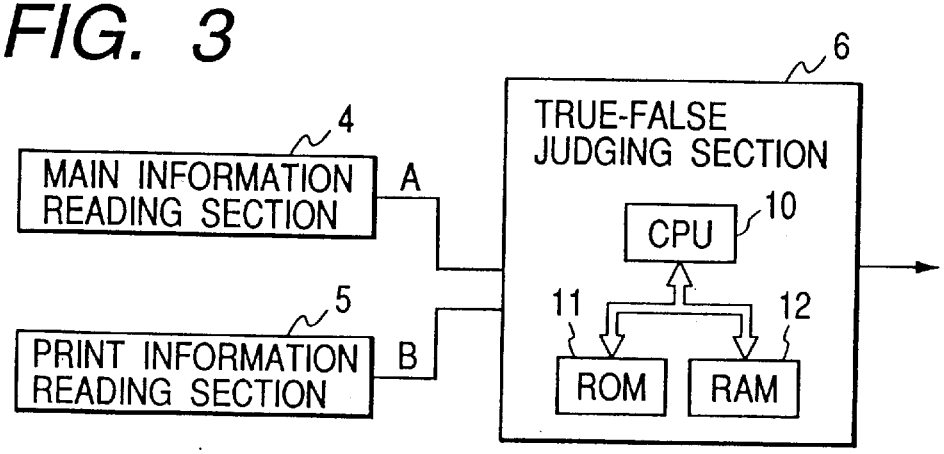

FIG. 5

| COMBINATION PATTERN | 11 | 12 | 13 | 14 | 15 | 21 | 22 | ... | 55 | N |
|---|---|---|---|---|---|---|---|---|---|---|
| INFORMATION IN RAM | | | | | | | | | | |
| (START OF OPERATION) | 0 | 0 | 0 | 0 | 0 | 0 | 0 | | 0 | 0 |
| (FIRST DISK) | 0 | 0 | 1 | 0 | 0 | 0 | 0 | | 0 | 1 |
| (SECOND DISK) | 0 | 0 | 1 | 0 | 0 | 1 | 0 | | 0 | 2 |
| (THIRD DISK) | 0 | 0 | 2 | 0 | 0 | 1 | 0 | | 0 | 3 |

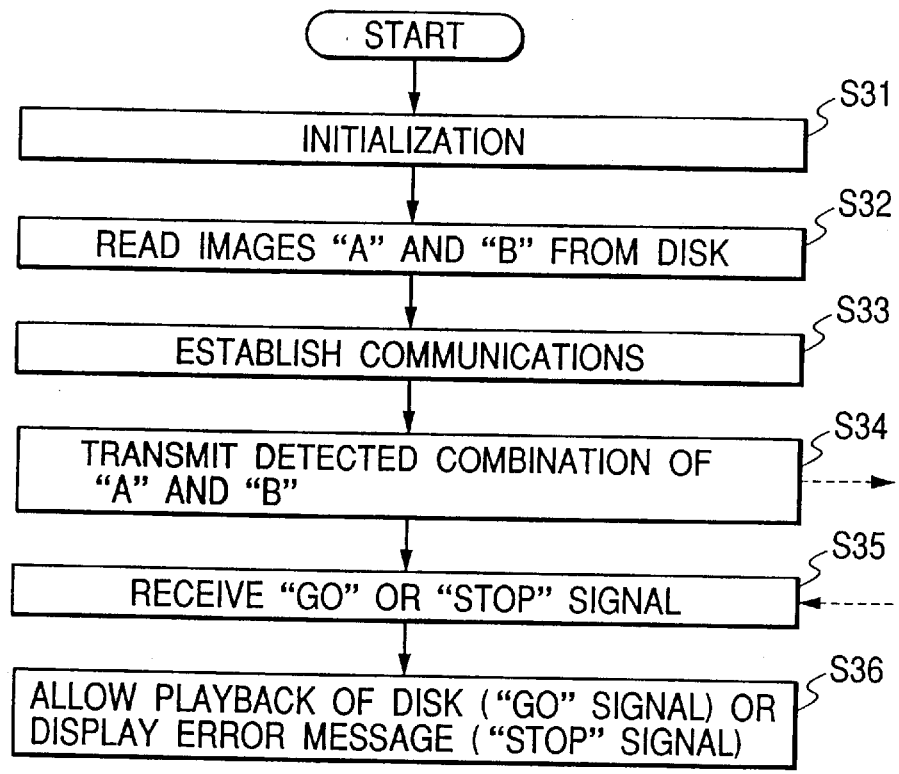
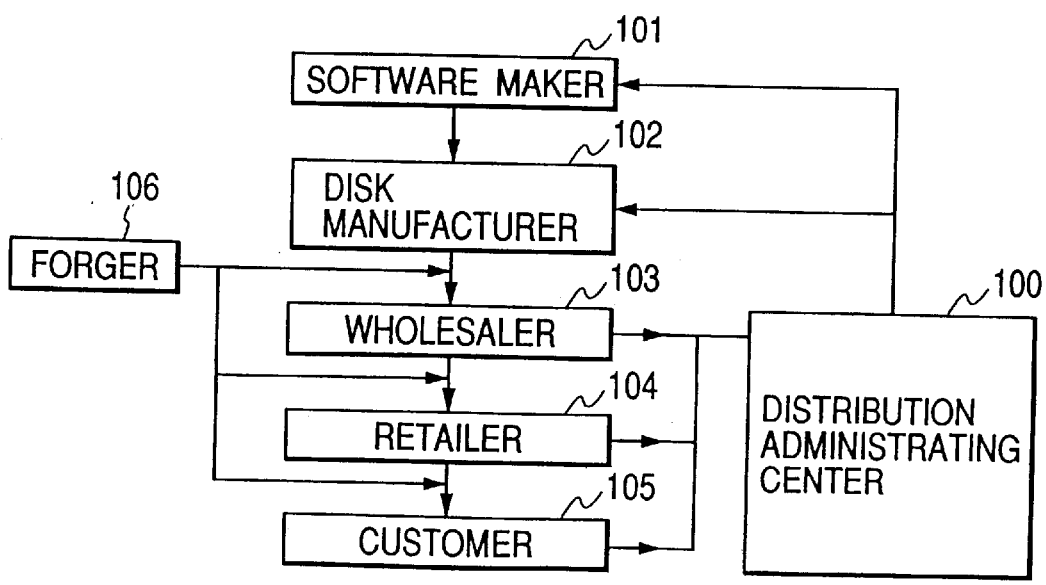

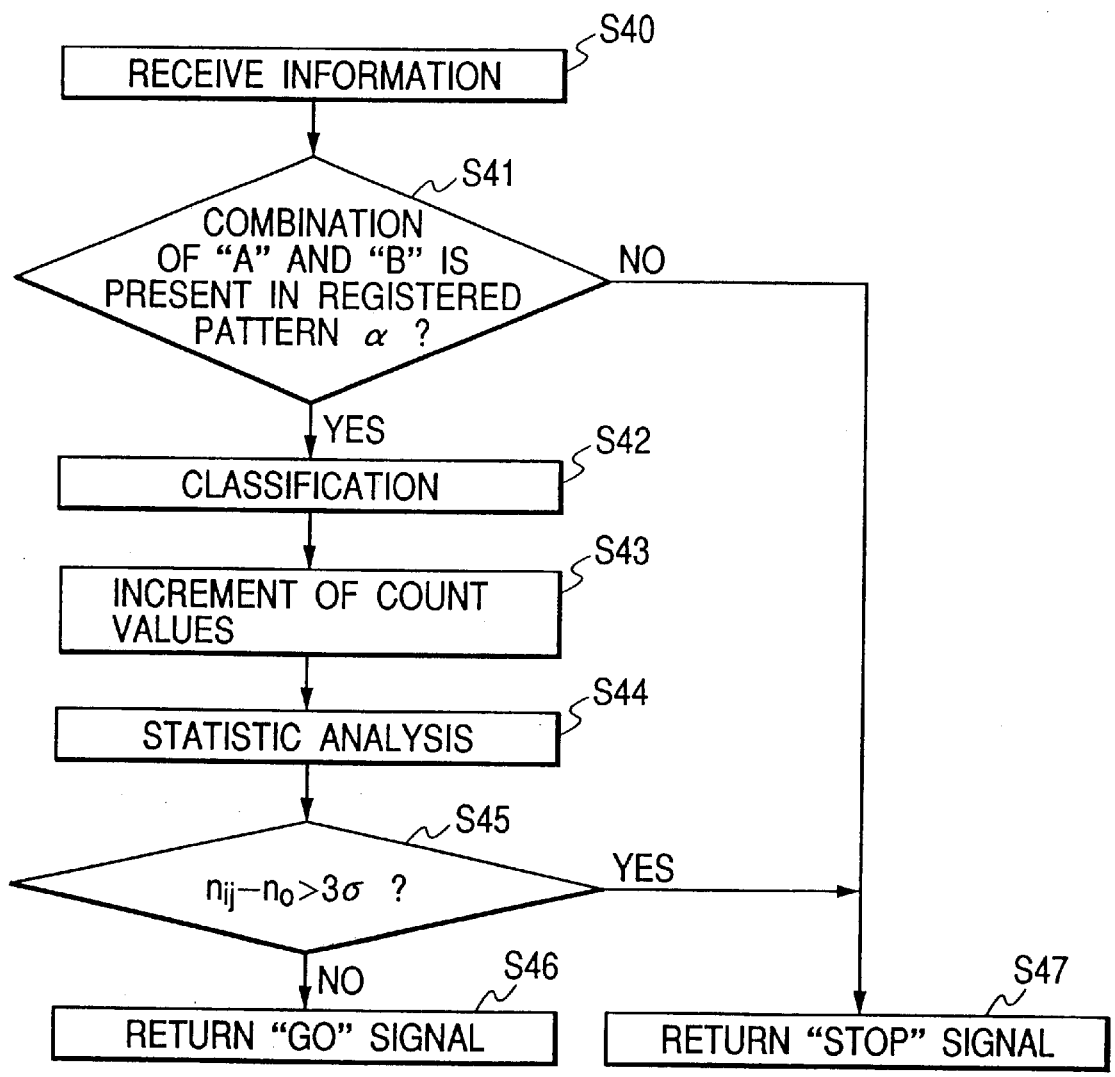

DISKLIKE RECORDING MEDIA, A METHOD FOR DETECTING FORGED DISKS, AN ANTI-FORGERY SYSTEM FOR PERFORMING A TRUE-FALSE JUDGEMENT BASED ON INFORMATION COLLECTED FROM THE RECORDING MEDIA, AND A MANUFACTURING APPARATUS FOR RECORDING INFORMATION IN THE DISKS

Continuation of patent application Ser. No. 10/038,534, filed Jan. 3, 2002; and which was itself a continuation of patent application Ser. No. 09/264,540, filed Mar. 8, 1999, now U.S. Pat. No. 6,363,043.

BACKGROUND OF THE INVENTION

The present invention relates to disklike recording media, such as CD (i.e., compact disk) and DVD (i.e., digital video disk or digital versatile disk), which are suitable for mass production and wide-areal distribution. More specifically, the present invention relates to an anti-forgery system, and related detecting apparatuses installable in the distribution channel or in a center office equipped with a host computer. Moreover, the present invention relates to a manufacturing method and apparatus for recording the information for a true-false judgement on the surfaces of the disk.

The conventional CD is preferably used for recording the audio information or program. The conventional VHD or LD is preferably used for recording video or image information. However, a recently developed DVD has a very large recording capacity which is approximately 5 to 7 times the recording capacity of the above-described conventional disks. Thus, the CD, VHD and LD will be replaced by DVD-Audio and DVD-Video.

In other words, the high-density recording media can provide an added value due to their large recording capacity. On the other hand, the industrial damage and monetary loss will be very large if they are subjected to the forgery.

SUMMARY OF THE INVENTION

An object of the present invention is to provide an anti-forgery system capable of accurately detecting forged products of the disklike recoding media at an earlier stage of the circulation of the forged products.

In order to accomplish the above and other related objects, one aspect of the present invention provides a recording medium comprising first information selected from a plurality of information patterns for a true-false judgement, and second information selected from another plurality of information patterns for the true-false judgement.

Preferably, the recording medium has a disklike body with a first surface on which the first information is recorded and a second surface on which the second information is recorded. In this case, the first information may be a pit or groove pattern formed on the first surface. A registered combination pattern of an enciphered format may be recorded on a specific area of a disk surface other than the first information and the second information. The first information and the second information are combined randomly.

Another aspect of the pre sent invention provides a system for detecting forged products of recording media. This system comprises a reading means for reading first information and second information from an inspected recording medium, a memory means for storing a plurality of registered combination patterns for a true-false judgement, and a true-false judging means for identifying the inspected recording medium as a forged product when no coincidence is found between a readout combination of the first and second information and the registered combination patterns.

Preferably, the true-false judging means is for further performing a statistic analysis when any coincidence is found between the readout combination and the registered combination patterns, thereby identifying the inspected recording medium as a forged product based on the result of the statistic analysis.

Preferably, in the statistic analysis, the true-false judging means is for detecting a combination pattern of the first and second information recorded on the forged product with reference to a standard deviation or a time differential value of the standard deviation.

Another aspect of the present invention provides an apparatus for detecting forged products of recording media. This apparatus comprises a reading means for reading first information and second information from an inspected recording medium, a transmitting means for transmitting a readout combination of the first and second information to a true-false judging apparatus, a receiving means for receiving a true-false judgement result from the true-false judging apparatus, and an output means for outputting the true-false judgement result.

Preferably, the readout combination of the first and second information is transmitted to the true-false judging apparatus by using a communication device and related communication software. The apparatus may be a playback apparatus of the disklike recording medium.

Another aspect of the present invention provides an apparatus for detecting forged products of recording. media. This apparatus comprises a memory means for storing a plurality of registered combination patterns for a true-false judgement, a receiving means for receiving a combination of first and second information read out from an inspected recording medium, and a true-false judging means for identifying the inspected recording medium as a forged product when no coincidence is found between the readout combination of the first and second information and the registered combination patterns.

In this case, the true-false judging means is for further performing a statistic analysis when any coincidence is found between the readout combination and the registered combination patterns, so as to identify the inspected recording medium as a forged product based on the result of the statistic analysis. The true-false judging means is for detecting a combination pattern of the first and second information recorded on the forged product with reference to a standard deviation or a time differential value of this standard deviation.

Moreover, another aspect of the present invention provides a manufacturing apparatus for a disklike recording medium. This manufacturing apparatus comprises a first recording means for recording main information including first information on a first surface of the disklike recording medium, and a second recording means for recording second information on a second surface of the disklike recording medium. Each of the first and second information is selected from a plurality of information patterns for a true-false judgement.

BRIEF DESCRIPTION OF THE DRAWINGS

The above and other objects, features and advantages of the present invention will become more apparent from the following detailed description which is to be read in conjunction with the attached drawings, in which:

FIG. 1 is a perspective view showing a recording disk and an apparatus for detecting forged products in accordance with a preferred embodiment of the present invention;

FIG. 2 is a view illustrating an example of combined true-false judging information to be recorded in the disk shown in FIG. 1;

FIG. 3 is a block diagram showing an essential arrangement of a forged product detecting system in accordance with the preferred embodiment of the present invention;

FIG. 5 is a view illustrating an example of the statistic processing for counting the agreement of the combination of the true-false judging information in accordance with the preferred embodiment of the present invention;

FIG. 15 is a flowchart showing the processing performed at a terminal of a customer shown in FIG. 12 in accordance with the preferred embodiment of the present invention;

FIG. 16 is a flowchart showing another processing performed in the distribution administrating center shown in FIG. 12 in accordance with the preferred embodiment of the present invention;

FIG. 17 is a view showing another relationship between the distribution channel of the disks and a forged product detecting system in accordance with the preferred embodiment of the present invention;

DESCRIPTION OF THE PREFERRED EMBODIMENTS

Figure 4:
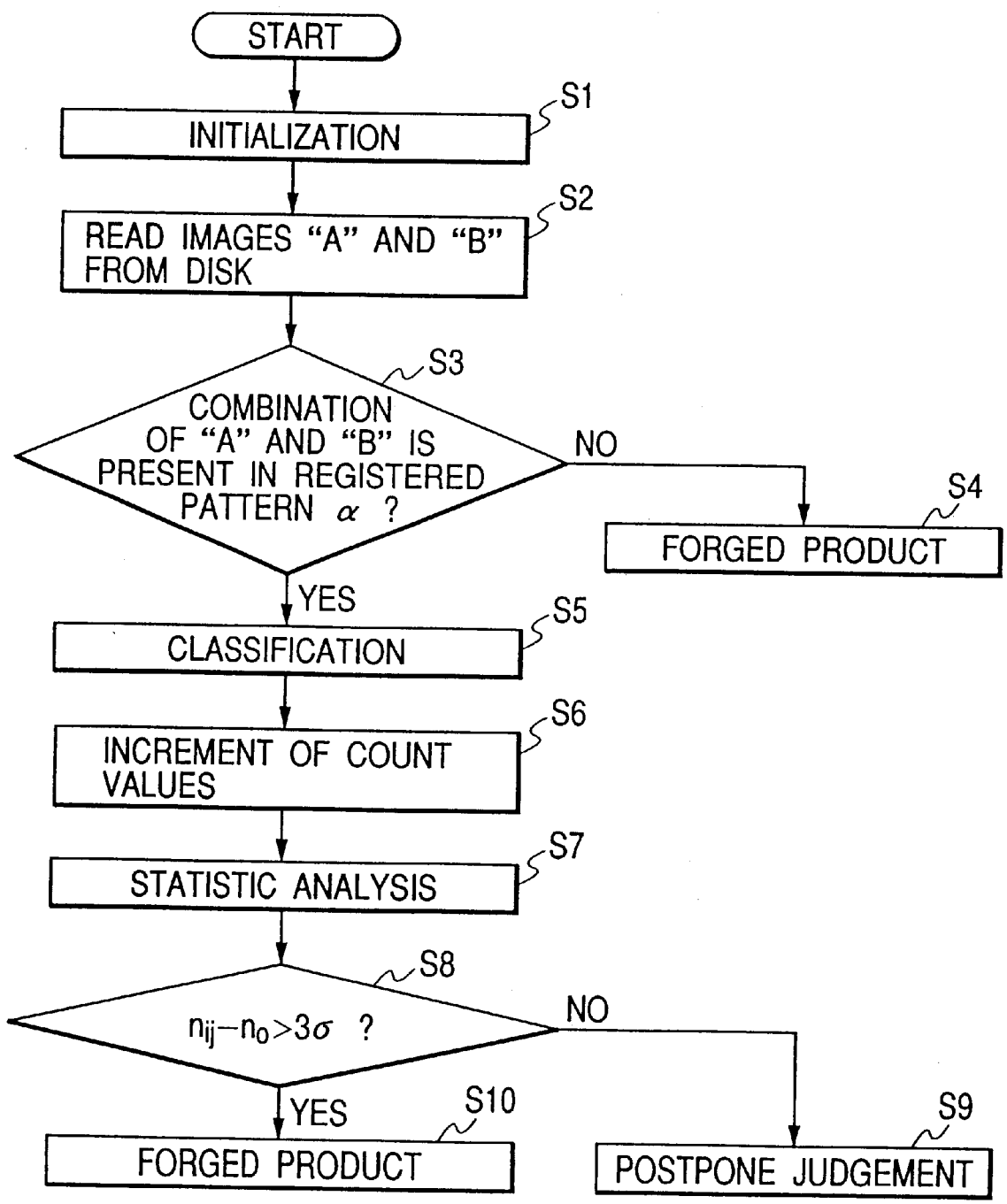
FIG. 4 is a flowchart illustrating the details of a true-false detection in accordance with the preferred embodiment of the present invention.

Hereinafter, preferred embodiments of the present invention will be explained with reference to the attached drawings.

FIG. 1 is a perspective view showing a recording disk and an apparatus for detecting forged products in accordance with a preferred embodiment of the present invention. In FIG. 1, a disk 1 has a first surface on which main information is recorded. The main information includes a first image "A" which is used in a true-false judgement for each disk. The disk 1 has a second surface on which a second image "B" is formed. The second image "B" is also used in the true-false judgement. The second image "B" and the main information including the first image "A" are read by a CCD line sensor 2 and a pickup lens 3, respectively. The data on the disk 1 is scanned when the disk 1 is rotating while the CCD line sensor 2 and the pickup lens 3 are stationarily fixed. The CCD line sensor 2 and the pickup lens 3, cooperatively serving as a reading device, can be replaced by any other optical, magnetic, magneto-optical, or capacitance sensors or devices having the equivalent function. The images "A" and "B" can be replaced by any other bar codes, characters, enciphered codes when the reading device can read or discriminate them. The true-false judgement information may be scrambled or mixed with other information so as not to be discriminable at a glance.

FIG. 2 shows simple samples of the true-false judgement information. The first image "A", serving as main information, is a mammoth portrait. The second image "B", serving as print information, is a clover mark. A total of five different patterns are prepared for each of the first and second images "A" and "B," so that one of them is arbitrarily selected as a true-false judgement information. According to this embodiment, the first image "A" is selectable from the group consisting of the mammoth, elephant, giraffe, ant eater, and horse portraits. The second image "B" is selectable from the group consisting of the clover, four-leaf clover, heart, spade, and diamond marks. Accordingly, this embodiment provides 25 (=5×5) patterns as the registered or authorized combinations of the first and second images "A" and "B." In other words, the pattern recorded in each disk 1 is one of the 25 registered or authorized patterns, with each pattern having an equal possibility (i.e., 1/25) to be selected.

The first images "A" may resemble each other but different in some portions so that the third party cannot find the difference between them. Similarly, the second images "B" may resemble each other but different in some portions.

FIG. 3 is a schematic arrangement of a forged product detecting system. A main information reading section 4 reads the main information (i.e., first image "A") recorded on the disk 1. A print information reading section 5 reads the print information (i.e., second image "B") printed on the disk 1. Each readout image is processed by using an appropriate image recognition software (not shown). A true-false judging section 6 receives the first image "A" from the main information reading section 4 and the second image "B" from the print information reading section 5. Based on a combination of the readout images "A" and "B", the true-false judging section 6 performs first and second true-false judgements shown in FIG. 4. The true-false judging section 6 comprises a CPU 10 performing the true-false judgements, and associated memories ROM 11 and RAM 12. The ROM 11 stores a total of 25 registered or authorized patterns α (i.e., 11, 12, 13, ..., 54, 55) as possible combinations of the first and second images "A" and "B." Furthermore, the ROM 11 stores a rule β for judging the circulation of forged products. The RAM 12 stores the history of readout combined image patterns by counting the occurrence of respective patterns 11, 12, 13, ..., 54, 55.

In the flowchart shown in FIG. 4, the initialization is performed in a step S1. Then, the images "A" and "B" are read from the disk 1 to be inspected in a step S2. Then, the true-false judging section 6 performs the first true-false judgement. More specifically, the combination of the readout images "A" and "B" is compared with the image patterns α stored in the ROM 11 in a step S3. If no coincidence is found (NO in the step S3), it is concluded in a step S4 that the inspected disk 1 is a forged product. If any coincidence is found (YES in the step S3), the true-false judging section 6 performs the second true-false judgement. More specifically, in a step S5, the detected combination of the readout images "A" and "B" is classified into the corresponding one of the 5×5 patterns of the image patterns α. Then, in a step S6, the RAM 12 increments a count value of the identified pattern as shown in FIG. 5. At the same time, a total disk number "N" is increased by 1. Then, the updated classification data is statistically processed in a step S7.

Figure 6:
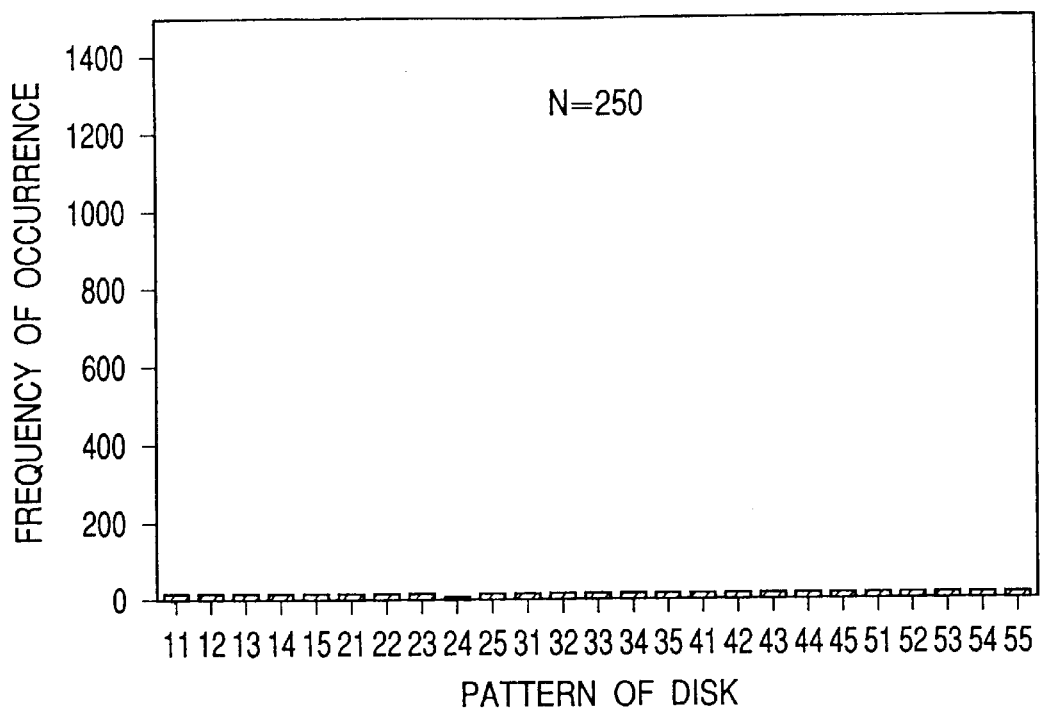
FIG. 6 is a histogram showing the relationship between the type of disk and its occurrence.
Figure 7:
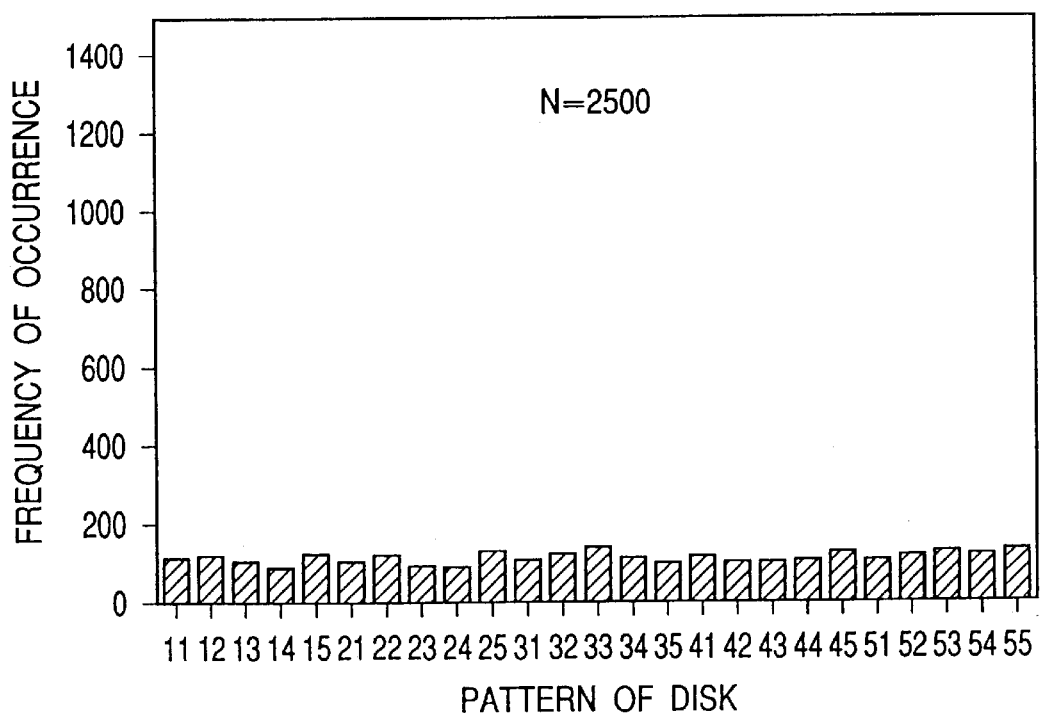
FIG. 7 is a histogram showing the relationship between the type of disk and its occurrence.

FIG. 6 is a histogram showing the relationship between the pattern of disk and the frequency of occurrence which is typically observed in an initial stage of the circulation of disks (e.g., N=250). FIG. 7 is a histogram showing the occurrence of the disk patterns observed when the total disk number "N" is increased (e.g., N=2,500). As apparent from FIG. 7, the frequency of occurrence in each disk pattern is substantially uniform when the 25 patterns are randomly used.

It is now assumed that circulation of forged products is started after the passage of a significant leading time. Many of the forged products contain the main information with no (or incomplete) print information. This kind of forged products can be easily checked by the above-described first true-false judgement. However, the first true-false judgement is no longer reliable when the forged products have perfect print information. In such a case, the circulation of the forged products can be detected by the increase of a particular disk pattern.

Figure 8:
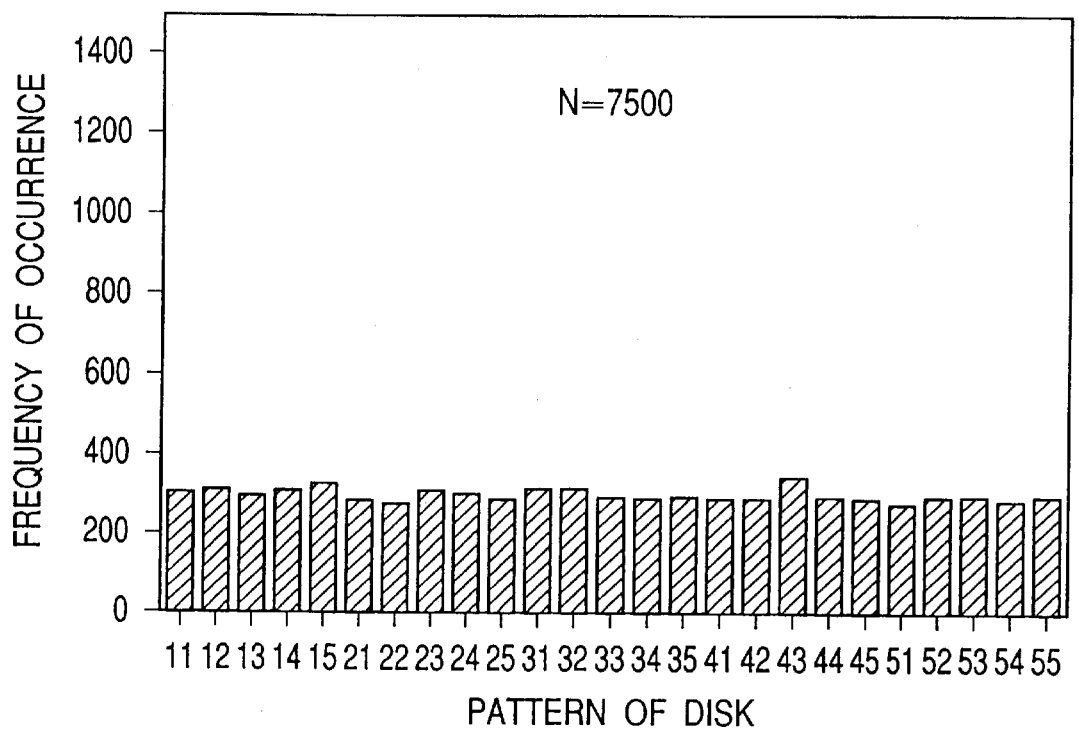
FIG. 8 is a histogram showing the relationship between the type of disk and its occurrence.

FIG. 8 is a histogram showing the occurrence of the disk patterns observed when the total disk number "N" is further increased (e.g., N=7,500). In this case, the occurrence of the pattern "43" is larger than other patterns by approximately 50. This is a sort of sign indicating the presence of forged products. From this sign, it is believed the circulation of forged products has just begun. On the other hand, this may be an accidental phenomenon.

Accordingly, in the step S7 of the flowchart shown in FIG. 4, the statistic analysis is performed to confirm the presence of the forged products. For example, the circulation of the forged products is confirmed when the occurrence $n_{ij}$ of a specific disk pattern (ij) is larger than the average occurrence $n_0$ of other patterns by a predetermined threshold. The rule β stored in the ROM 11 determines this predetermined threshold (e.g., 3σ). Thus, in a step S8, it is checked whether the value $(n_{ij}-n_0)$ is equal to or larger than 3σ, where σ represents a standard deviation. The occurrence $n_{43}$ of the pattern "43" shown in FIG. 8 does not yet exceed 3σ. Thus, the decision of the forged product circulation is postponed in a step S9.

Figure 9:
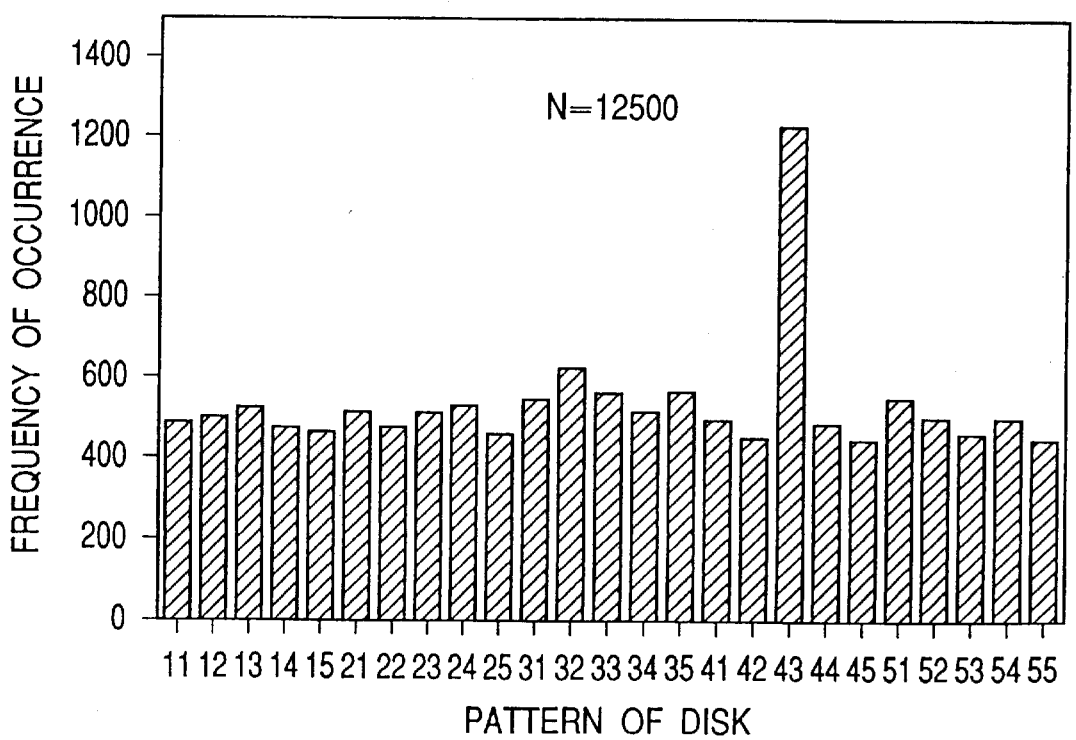
FIG. 9 is a histogram showing the relationship between the type of disk and its occurrence.

FIG. 9 is a histogram showing the occurrence of the disk patterns observed when the total disk number "N" is 12,500. In this case, the occurrence $n_{43}$ of the pattern "43" is larger than the average occurrence $n_0$ of other patterns by approximately 800. The difference 800 is sufficiently larger than 3σ. Thus, it is concluded that approximately 800 forged products have been already circulated in the market at this timing (step S10).

Although the above-described threshold (e.g., 3σ) is read out from the ROM 11, it is possible to arbitrarily modify the readout threshold according to the intent of the user. For example, the threshold based on the rule β can be modified considering the total disk number "N." Therefore, the judgement of the forged products may be made when the number of disks having a certain pattern exceeds 800 with respect to the total disk number N=13,300. If the threshold is reduced to 2σ, the forged products will be detected at an earlier stage although the accurateness in the true-false judgement will be worsened.

Figure 10:
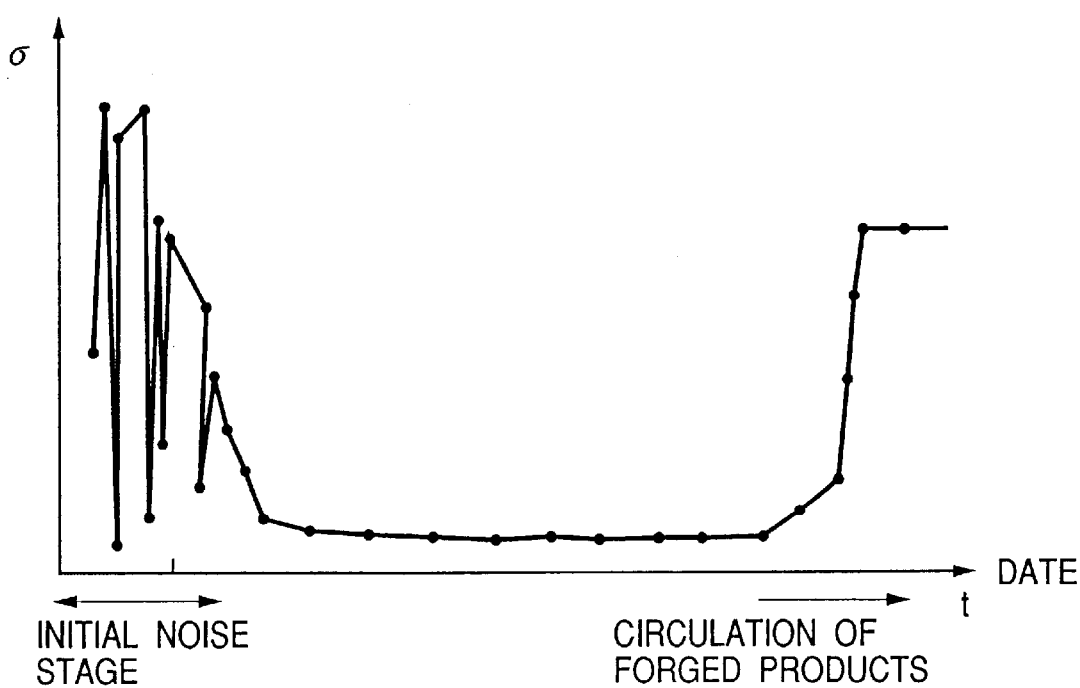
FIG. 10 is a graph showing the history of the variation in the standard deviation.
Figure 11:
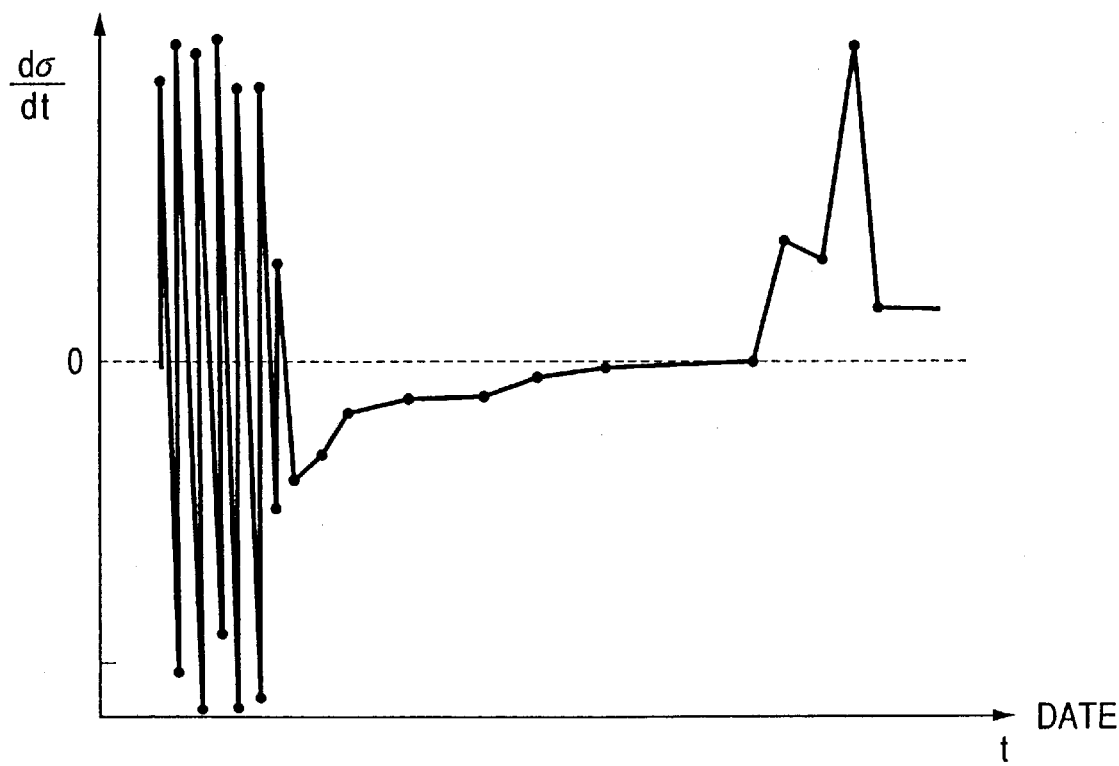
FIG. 11 is a graph showing the history of the variation in the time differential value of the standard deviation.

It is preferable to monitor the statistic data periodically for each of the patterns (i.e., 5×5=25 patterns). FIG. 10 shows the change or transition of the standard deviation a in relation to the passage of time (date), which is observed on a certain pattern. The noise rate is high in the initial stage since the total number of the disks circulated in the market is small. Accordingly, it is preferable to cancel the judgement during the initial stage (i.e., during the noise period). The standard deviation a then decreases and stabilizes at a constant value after the noise period has passed. In other words, the time differential value of the standard deviation (i.e., dσ/dt) gradually converges at 0 as the total disk number increases. However, once the forged products start circulating in the market, the standard deviation a starts increasing correspondingly. Its time differential value dσ/dt also increases rapidly toward a positive direction. Thus, the circulation of the forged products is sensitively detectable based on the time differential value dσ/dt. Furthermore, although the system may be complicated, it will be possible to detect the presence of the forged products. by statistically monitoring the publication of the disk 1 with reference to the standard deviation a and its differential value dσ/dt.

Accordingly, this embodiment makes it possible to surely detect the forged products regardless of sophistication in the forging technology. Furthermore, it is possible to accurately specify the pattern assigned to the forged disk. Only the software maker and the authorized manufactures can know the details of the first image "A" and the second image "B" and their combination patterns. It is impossible for the third parties to manufacture a great amount of forged products without being checked by the above-described true-false judgements. Even if the third parties know the presence of the first and second images "A" and "B", it will take a long time to analyze the details of the concealed disk patterns and distribution ratio of each combination and will be necessary to invest a great amount of money to prepare the same patterned disks.

Although 25 (=5×5) patterns are prepared for the images "A" and "B" in the above-described embodiment, it is possible to change the number of combinations. Increasing the total number of combinations is effective to detect forged products in an earlier stage. Although the prepared patterns are randomly or uniformly assigned to the disks in the above-described embodiment, it is possible to intentionally change the distribution ratio of each combined disk patterns. For the third parties, analyzing the intentionally-determined distribution ratio will be a more-complicated and time-consuming work.

Figure 12:
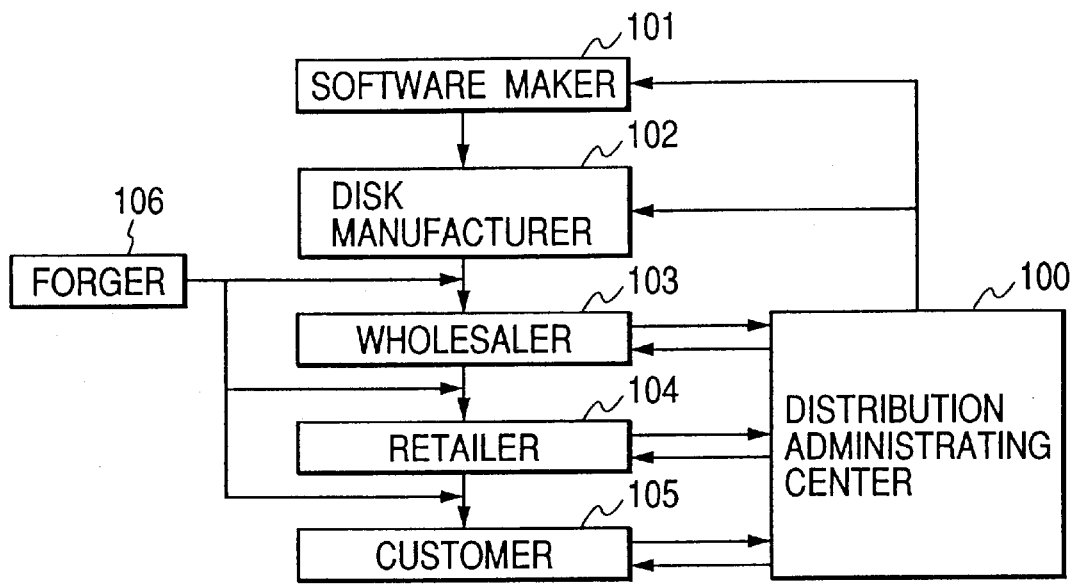
FIG. 12 is a view showing a relationship between a distribution channel of disks and a forged product detecting system in accordance with the preferred embodiment of the present invention.

FIG. 12 shows a distribution channel of the disk 1 when the disk 1 is a read-only disk, such as CD or DVD. A software maker 101, who is a copyright holder, produces the software to be distributed. A disk manufacturer 102 produces the disks 1 in response to the request from the software maker 101. The mass produced disks 1 are sent to a wholesaler 103. The wholesaler 103 distributes the disks 1 to a retailer 104, such as a software shop, a disk shop, a record shop, or an electric appliance shop. A customer 105 buys the disk 1 at the retailer 104. The forger 106 invades somewhere in this distribution channel to circulate the forged products.

The true-false detecting apparatus performing the processing shown in FIG. 4 is placed in each of the wholesaler 103 and the retailer 104 to detect the forged products by checking all or part of the disks handled by them. Accordingly, the presence of the forged products is notified from the wholesaler 103 or the retailer 104 to the software maker 101 or the disk manufacturer 102. A distribution administrating center 100 collects the information from the true-false detecting apparatus installed in each of the wholesaler 103 and/or the retailer 104. Accordingly, the presence of the forged products is checked by the distribution administrating center 100. Establishing the distribution administrating center 100 is advantageous when the disks are distributed through numerous franchised shops which may be located nationwide or worldwide. It will be easy to check a wide-area circulation of the forged products.

In the arrangement shown in FIG. 12, the distribution administrating center 100 communicates with the terminals (i.e., the true-false detecting apparatuses) in the wholesaler 103 and/or the retailer 104 via radio or cable communication lines.

Figure 13:
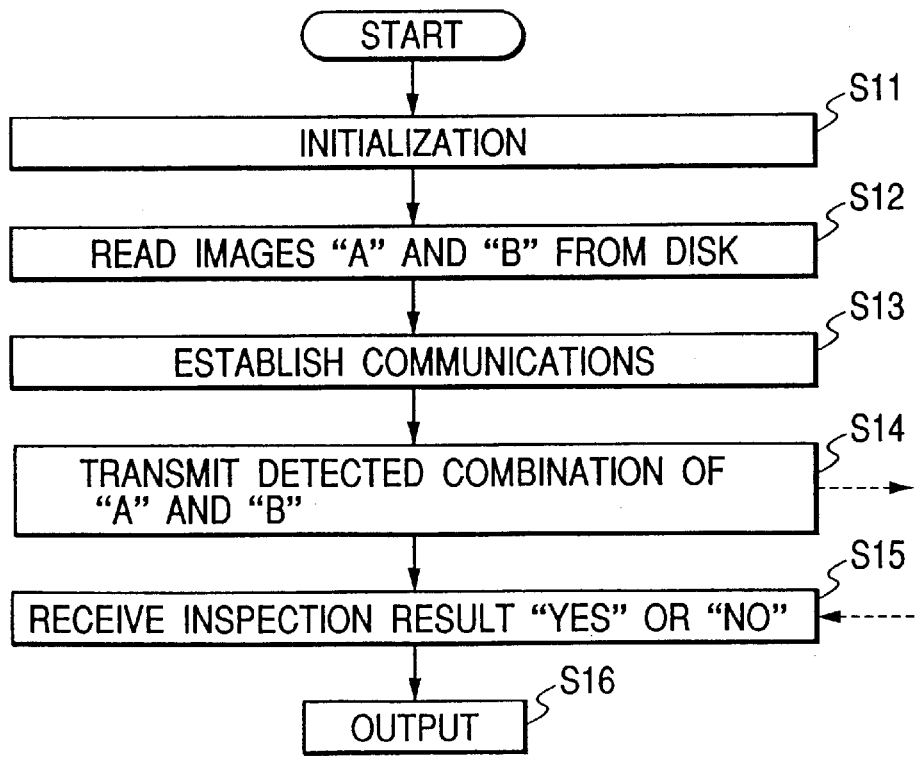
FIG. 13 is a flowchart showing the processing performed at a terminal of the wholesale or retail shop shown in FIG. 12 in accordance with the preferred embodiment of the present invention.

FIG. 13 is a flowchart showing the processing performed in each terminal of the wholesaler 103 and/or the retailer 104. First, in a step S11, the initialization is performed. Then, in a step S12, the images "A" and "B" are read from the disk 1 to perform the true-false judgement. Then, in a step S13, the communication line is connected between the terminal and the distribution administrating center 100. In a step S14, the detected combination of the images "A" and "B" is transmitted to the distribution administrating center 100. The distribution administrating center 100 checks the received information with the registered data. Then, the distribution administrating center 100 returns the inspection result to the terminal. Thus, in a step S15, the terminal receives an answer signal of "YES" or "NO" returned from the distribution administrating center 100. Then, in a step S16, the terminal notifies an operator of the true-false judgement result through a display unit.

Figure 14:
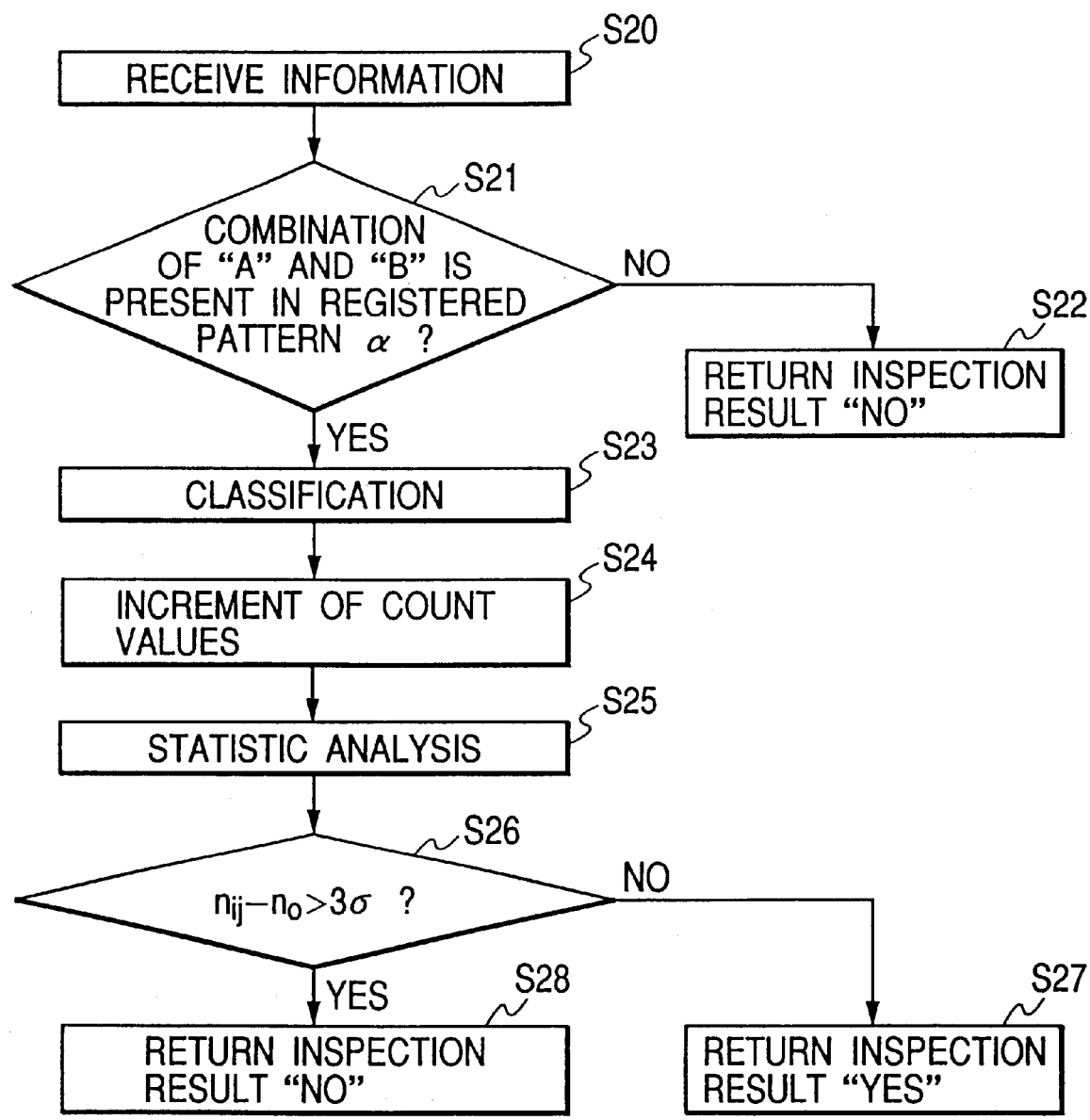
FIG. 14 is a flowchart showing the processing performed in a distribution administrating center shown in FIG. 12 in accordance with the preferred embodiment of the present invention.

FIG. 14 is a flowchart showing the processing performed in the distribution administrating center 100. The distribution administrating center 100 comprises CPU 10, ROM 11 and RAM 12 having the same functions as those of the true-false judging section 6 disclosed in FIG. 3. The distribution administrating center 100 receives the information from the terminal in a step S20 to perform the first true-false judgement. The combination of the images "A" and "B" transmitted from the terminal is compared with the image patterns $\alpha$, i.e., 25 (=5×5) patterns, stored in the ROM 11 in a step S21. If no coincidence is found (NO in the step S21), it is concluded that the inspected disk 1 is a forged product. Thus, in step S22, the distribution administrating center 100 returns the inspection result "NO" to the terminal (refer to the step S15 in the flowchart of FIG. 13).

If any coincidence is found (YES in the step S21), the distribution administrating center 100 performs the second true-false judgement. More specifically, in a step S23, the detected combination of the transmitted images "A" and "B" is classified into the corresponding one of the 5×5 patterns of the image patterns $\alpha$. Then, in a step S24, the RAM 12 increments a count value of the identified pattern as shown in FIG. 5. At the same time, a total disk number "N" is increased by 1. Then, the updated classification data is statistically analyzed in a step S25. For example, the circulation of the forged products is confirmed when the occurrence $n_{ij}$ of a specific disk pattern (ij) is larger than the average occurrence no of other patterns by a predetermined threshold. The rule $\beta$ stored in the ROM 11 determines this predetermined threshold (e.g., 3$\sigma$). Thus, in a step S26, it is checked whether the value ($n_{ij}-n_0$) is equal to or larger than 3$\sigma$, where a represents the standard deviation. When the judgement result is "NO" in the step S27, the decision of the forged product circulation is postponed as the total number of the forged products is small. Thus, the distribution administrating center 100 returns the inspection result "YES" to the terminal (refer to the step S15 in the flowchart of FIG. 13). On the other hand, when the judgement result is "YES" in the step S26, it is concluded that a significant amount of forged products have been already circulated in the market at this timing. Thus, in a step S28, the distribution administrating center 100 returns the inspection result "NO" to the terminal.

According to the above-described embodiment, the distribution administrating center 100, serving as a center office equipped with a host computer, performs the first and second true-false judgements. There is no necessity of providing the memories 11 and 12 in each terminal in the wholesaler 103 and the retailer 104. Accordingly, the system cost is inexpensive. The memories 11 and 12 storing the secret information can be safely managed at the center office which is isolated from the market. The distribution administrating center 100 can be provided for each manufacturer 102 or commonly used by a group of manufactures 102. It is preferable that the distribution administrating center 100 periodically transmits the information to manufactures 102 or software makers 101. In this case, the information may include the manufactured amount of the disk 1, detailed allocation of the combination patterns of the images "A" and "B", and the presence of the forged products.

Returning to the actual market, there are some problems to be solved. For example, some of the forged products will circulate through a mail-order selling channel, a door-to-door selling channel, or a street stall other than the retailer 104. An ill-intentioned retailer 104 will not mind to unlawfully sell the forged disks. No information is transmitted to the distribution administrating center 100 since the terminals are not used in these cases.

To solve this kind of problems, the present invention proposes a system including a modem and a communication software incorporated in the disk recording/playback system of the customer 105 (FIG. 12).

FIG. 15 is a flowchart showing the processing performed in the disk recording/playback system of the customer 105. First, in a step S31, the initialization is performed. Then, in a step S32, the images "A" and "B" are read from the disk 1 to perform the true-false judgement. Then, in a step S33, the communication line is connected via the modem between the disk recording/playback system and the distribution administrating center 100. In a step S34, the detected combination of the images "A" and "B" is transmitted to the distribution administrating center 100. The distribution administrating center 100 checks the received information with the registered data. Then, the distribution administrating center 100 returns the inspection result to the terminal. Thus, in a step S35, the disk recording/playback system receives an answer signal of "GO" or "STOP" returned from the distribution administrating center 100. Then, in a step S36, the disk recording/playback system allows the playback of the disk 1 in response to the "GO" signal and displays an error message or ejects the disk 1 in response to the "STOP" signal.

FIG. 16 is a flowchart showing the processing performed in the distribution administrating center 100. The distribution administrating center 100 receives the information from the disk recording/playback system in a step S40 to perform the first true-false judgement. The combination of the images "A" and "B" transmitted from the disk recording/playback system is compared with the image patterns a, i.e., 25 (=5×5) patterns, stored in the ROM 11 in a step S41. If no coincidence is found (NO in the step S41), it is concluded that the inspected disk 1 is a forged product. Thus, in step S47, the distribution administrating center 100 returns the "STOP" signal to the disk recording/playback system.

If any coincidence is found (YES in the step S41), the distribution administrating center 100 performs the second true-false judgement. More specifically, in a step S42, the detected combination of the transmitted images "A" and "B" is classified into the corresponding one of the 5×5 patterns of the image patterns α. Then, in a step S43, the RAM 12 increments a count value of the identified pattern as shown in FIG. 5. At the same time, a total disk number "N" is increased by 1. Then, the updated classification data is statistically analyzed in a step S44. For example, the circulation of the forged products is confirmed when the occurrence $n_{ij}$ of a specific disk pattern (ij) is larger than the average occurrence $n_0$ of other patterns by a predetermined threshold. The rule β stored in the ROM 11 determines this predetermined threshold (e.g., 3σ). Thus, in a step S45, it is checked whether the value $(n_{ij} - n_0)$ is equal to or larger than 3σ, where a represents the standard deviation. When the judgement result is "NO" in the step S45, the decision of the forged product circulation is postponed as the total number of the forged products is small. Thus, the distribution administrating center 100 returns the "GO" signal to the disk recording/playback system (refer to the step S35 in the flowchart of FIG. 15). On the other hand, when the judgement result is "YES" in the step S45, it is concluded that a significant amount of forged products have been already circulated in the market at this timing. Thus, in a step S47, the distribution administrating center 100 returns the "STOP" signal to the disk recording/playback system (refer to the step S35 in the flowchart of FIG. 15).

This system is applicable not only to so-called standalone type disk recording/playback systems but also to built-in disk recording/playback systems of the personal computers. The communication hardware and software of the personal computers can be effectively used in this case.

The above-described forged product detecting system can be flexibly modified according to the type of distribution channel. For example, as shown in FIG. 17, it is possible to connect each of the wholesaler 103, the retailer 104, and the customer 105 to the distribution administrating center 100 via a unidirectional communication line, instead of using the bidirectional communication line. This system sufficiently works in roughly checking the circulated condition of the forged products.

The presently available cable communications, radio communications, analog lines and digital lines are usable for the communications in the above-described forged product detecting system. The high-speed digital lines, such as ISDN, are preferably used for the bidirectional communications. However, the analog lines will be sufficient for the unidirectional communications. Regarding the lines, the direct connection is preferable. However, it is possible to establish the communication line via the Internet or any other commercially available communication network. The E-mail or telex will be used in the unidirectional communication, since the time lag of few days will be allowed. Furthermore, when a product managing system is already installed in the wholesaler 103 or in the retailer 104, the bidirectional communication function of the existing product managing system will be utilized for the forged product detecting system. When the customer 105 likes the outdoor use of the playback system, a portable telephone or a similar handy phone will be used as a communication device for transmitting the information to the distribution administrating center 100.

Furthermore, when the information is sent from the wholesaler 103, the retailer 104 or the customer 105 to the distribution administrating center 100, it is preferable to add identification data, such as a code number, address, telephone number, and a network ID. These data will be effectively used in the succeeding procedure performed in the distribution administrating center 100.

Figure 18:
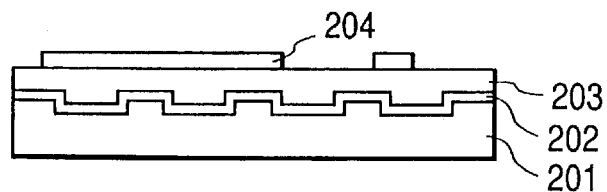
FIG. 18 is a side cross-sectional view showing a compact disk in accordance with the preferred embodiment of the present invention.

Hereinafter, the detailed arrangement of the disk 1 will be explained with reference to cross-sectional views. FIG. 18 shows a CD including a substrate 201, a first recording layer 202 formed on the substrate 201, a protection layer 203 formed on the first recording layer 202, and a second recording layer 204. The main information including the first image "A" is recorded in the first recording layer 202. The second image "B" is recorded in the second recording layer 204. More specifically, the substrate 201 is a polycarbonate or acrylic or polyolefine substrate having a thickness of 1.2 mm. The image "A" is a fine pit or groove pattern formed on the upper surface of this substrate 201 by stamping. The first recording layer 202 contains a metal selected from the group consisting of aluminum, gold, silver, copper, titanium, chrome, nickel, tantalum, molybdenum, iron and silicon which has a high reflectivity, or their alloys. The protection layer 203 is, for example, made of a ultraviolet ray curable resin for protecting the first recording layer 202. The layer 204 is formed by screen printing or offset printing to form the image "B." The first recording layer 202 has a lower transmissivity to prevent the leakage of information between the first recording layer 202 and the second recording layer 204.

Figure 19:
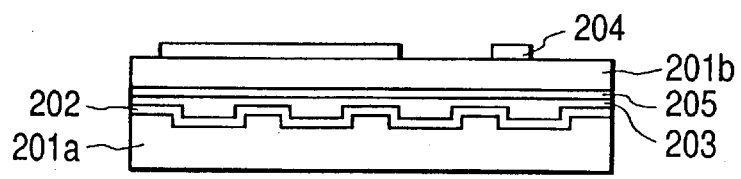
FIG. 19 is a side cross-sectional view showing a digital versatile disk in accordance with the preferred embodiment of the present invention.

FIG. 19 shows a DVD of 4.7 GB which has a bonded-substrate structure. The main information including the first image "A" is recorded on a first substrate 201a (0.6 mm thick). A first recording layer 202 is formed on the upper surface of the first substrate 201a. A protection layer 203 is formed on the first recording layer 202. A second substrate 201b (0.6 mm thick) is bonded on the protection layer 203 via an adhesive layer 205 (e.g., ultraviolet ray curable type). A second recording layer 204, in which the second image "B" is formed, is partly printed on the upper surface of the second substrate 201b.

Figure 20:
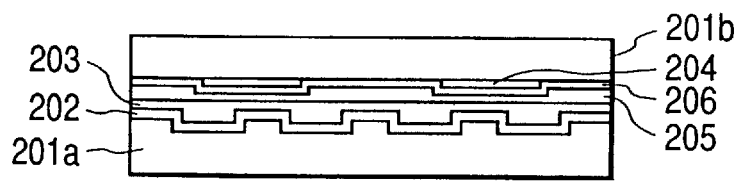
FIG. 20 is a side cross-sectional view showing another digital versatile disk in accordance with the preferred embodiment of the present invention.

FIG. 20 shows another DVD of 4.7 GB which has a similar bonded-substrate structure. The main information including the first image "A" is recorded on the first substrate 201a (0.6 mm thick). The first recording layer 202 and the protection layer 203 are successively formed on the upper surface of the first substrate 201a. On the other hand, the second recording layer 204 is partly printed on the lower surface of the second substrate 201b (0.6 mm thick). A shielding layer 206 is formed entirely along the lower surface of the second substrate 201b including the printed second recording layer 204 by white ink or whole-surface screen printing. The protecting layer 203 and the shielding layer 206 are bonded by the adhesive layer 205 (ultraviolet ray curable type). The shielding layer 206 conceals the rolling patterns peculiar to the adhesive, thereby eliminating the reading error by the CCD line sensor 2.

Figure 21:
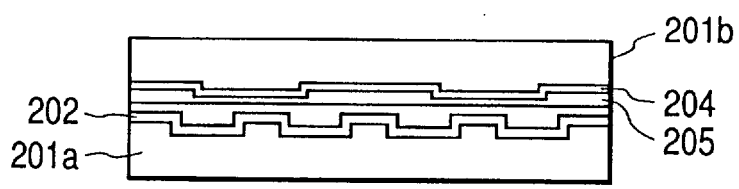
FIG. 21 is a side cross-sectional view showing another digital versatile disk in accordance with the preferred embodiment of the present invention.

FIG. 21 shows another DVD of 4.7 GB which has another similar bonded-substrate structure. The main information including the first image "A" is recorded on the first substrate 201a (0.6 mm thick). The first recording layer 202 and the protection layer 203 are successively formed on the upper surface of the first substrate 201a. The second image "B" is formed on the lower surface of the second substrate 201b by stamping. The second recording layer 204 is formed on the lower surface of the second substrate 201b. The second recording layer 204 contains a metal selected from the group consisting of aluminum, gold, silver, copper, titanium, chrome, nickel, tantalum, molybdenum, iron and silicon which has a high reflectivity, or their alloys. The first recording layer 202 and the second recording layer 204 are bonded by the adhesive 205 of adhesive sheet type. According to this arrangement, the CCD line sensor 2 can be replaced by the pickup lens 3. It is also possible to replace the first recording layer 202 by a semitransparent layer, e.g., a thin metallic film or a thin dielectric layer. In this case, it becomes possible to read the information of the second recording layer 204 through the first recording layer 202 by the pickup lens 3 placed near the substrate 201. In other words, the total number of the required sensors can be reduced to only one (i.e., single pickup lens 3).

The present invention is not limited to the above-described CD and DVDs, and therefore can be applied to MO disks, phase-change type disks, and write once type disks. In this case, the first recording layer 202 is replaced by a conventional MO medium (e.g., a multilayered structure of SiO.TbFeCo.SiN.Al). The present invention can be applied to a multilayered disk having three or more information surfaces. In this case, the images "A" and "B" are arbitrarily disposed on selected surfaces. The thickness of the disk substrate is not limited to 0.6 mm or 1.2 mm.

Figure 22:
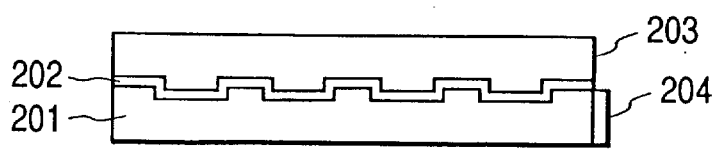
FIG. 22 is a side cross-sectional view showing a read only HDTV disk in accordance with the preferred embodiment of the present invention.

FIG. 22 shows a read only HDTV (high-definition television) disk including a 0.8 mm substrate 201 on which the main information including the first image "A" is recorded. The first recording layer 202 and the protection layer 203 are successively formed on the upper surface of the substrate 201. The second recording layer 204, in which the second image "B" is formed, is printed along the cylindrical side surface of the substrate 201 by bar-code printing or by stamping. According to this arrangement, the protecting layer 203 has a free upper surface on which another substrate can be bonded to realize a high-density disk.

It is preferable that the image "A" is recorded by a special recording method so as not to be easily deciphered by the third parties. For example, the image "A" is recorded in a lead-in area, a lead-out area, or a stamp area describing the disk number. It is also preferable to incorporate the image "A" as a low-frequency wobble signal into the main information. It is also preferable to incorporate the image "A" as an asymmetry variation of the RF signal. It is also possible to incorporate the image "A" as an electric watermark into the main image or video information. Moreover, the present invention can be combined with any existing anti-forgery method.

Furthermore, instead of using the ROM 11, it is possible to record the registered image patterns "α" in an enciphered format on a specific area of the disk 1.

Figure 23:
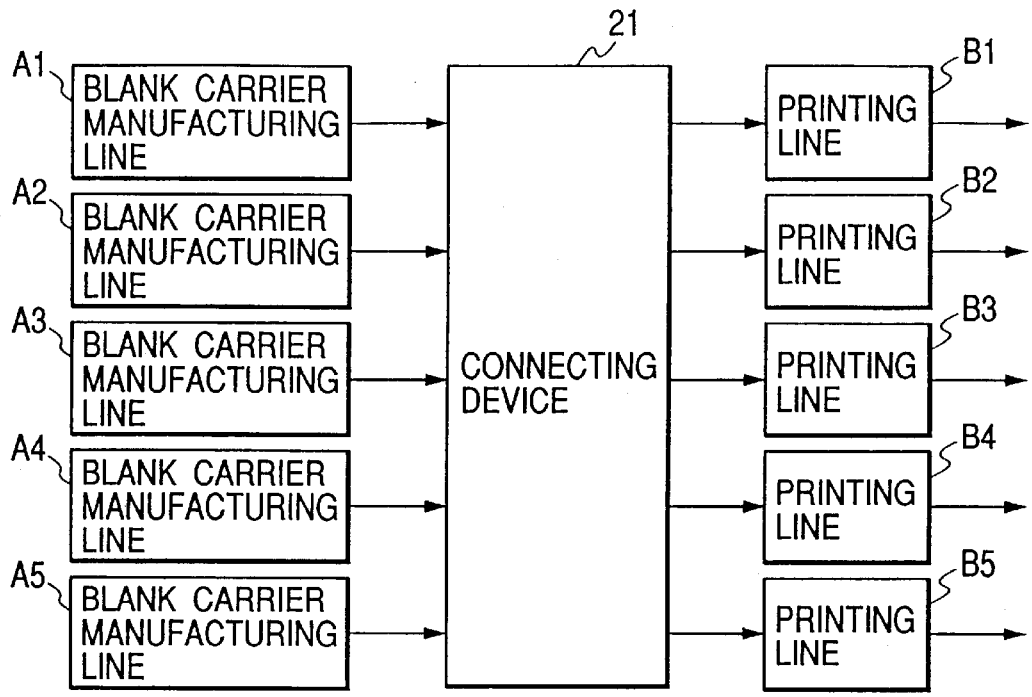
FIG. 23 is a block diagram showing a disk manufacturing system in accordance with the preferred embodiment of the present invention.
Figure 24:
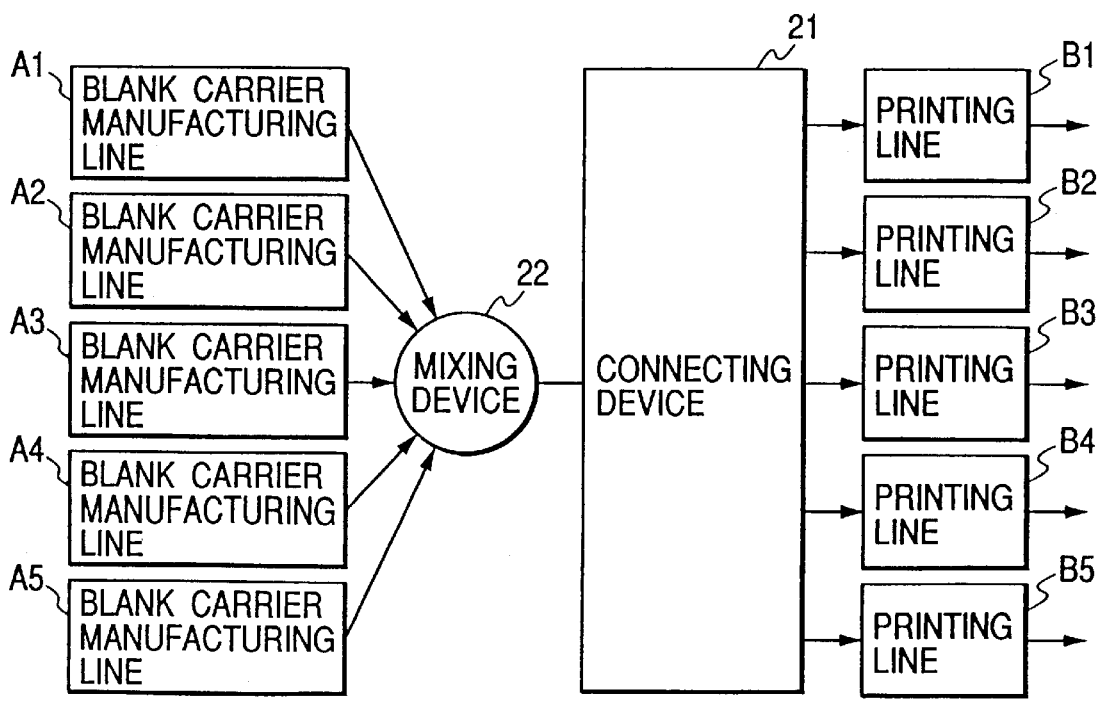
FIG. 24 is a block diagram showing another disk manufacturing system in accordance with the preferred embodiment of the present invention.

FIG. 23 shows a disk manufacturing facility for recording the first image "A" into the main information and printing the second image "B" to the disk 1. There are a total of five blank carrier manufacturing lines A1 to A5 each recording the main information including a designated pattern of the image "A" on a blank disk. Similarly, there are a total of five printing lines B1 to B5 each printing the designated pattern of the image "B" on the disk 1. A connecting device 21, interposed between the blank carrier manufacturing lines A1~A5 and the printing lines B1~B5, randomly connects one blank carrier manufacturing line to one printing line to manufacture the 25 patterned disks 1. It is possible to interpose a mixing device 22 between the blank carrier manufacturing lines A1~A5 and the connecting device 21, as shown in FIG. 24.

This invention may be embodied in several forms without departing from the spirit of essential characteristics thereof. The. present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A recording medium used for storing first information and second information, in which;
    said first information stored in said recording medium is selected from a first group of true-false judgement patterns prepared beforehand;
    said second information stored in said recording medium is selected from a second group of true-false judgement patterns prepared beforehand;
    said first information and said second information are independent from each other; and
    a combination of said first information and said second information is necessary for performing a true-false judgement to identify a forged product.

2. The recording medium in accordance with claim 1, wherein said recording medium has a bonded-substrate structure comprising:
    a first substrate having a thickness of 0.6 mm,
    a second substrate having a thickness of 0.6 mm, and
    an adhesive layer intervening between said first substrate and said second substrate.

3. The recording medium in accordance with claim 2, wherein said second information is recorded as bar code.

4. The recording medium in accordance with claim 1, wherein said recording medium is a digital video disk (DVD) having a storage capacity of 4.7 GB.

5. The recording medium in accordance with claim 4, wherein said second information is recorded as bar code.

6. The recording medium in accordance with claim 1, wherein said recording medium is a phase-change type disk.

7. The recording medium in accordance with claim 1, wherein said recording medium is a write once type disk.

8. The recording medium in accordance with claim 1, wherein said recording medium is a magneto-optical (MO) disk.

9. The recording medium in accordance with claim 1, wherein said first information is recorded in a lead-in area of said recording medium.

10. The recording medium in accordance with claim 1, wherein said first information is recorded as a pit or groove pattern.

11. The recording medium in accordance with claim 1, wherein said first information is formed by stamping as a pit or groove pattern.

12. The recording medium in accordance with claim 1, wherein said second information is recorded as bar code.

13. The recording medium in accordance with claim 1, wherein said recording medium is a disklike information recording medium.

14. An apparatus for reading information recorded in a recording medium, comprising:

first reading means for reading first information stored in said recording medium, said first information being selected from a first group of true-false judgement patterns prepared beforehand; and second reading means for reading second information stored in said recording medium, said second information being selected from a second group of true-false judgement patterns prepared beforehand, wherein said first information and said second information are independent from each other, a combination of said first information and said second information is necessary for performing a true-false judgement to identify a forged product, and said first reading means and said second reading means are an optical pickup reading device.

15. The reading apparatus in accordance with claim 14, wherein said recording medium is a disklike information recording medium.

* * * * *